(12) United States Patent
Morris

(10) Patent No.: US 9,902,494 B2
(45) Date of Patent: Feb. 27, 2018

(54) VERTICAL TAKE OFF AIRCRAFT

(71) Applicant: MARTIN UAV, LLC, Santa Clara, CA (US)

(72) Inventor: Stephen Morris, Sunnyvale, CA (US)

(73) Assignee: MARTIN UAV, LLC, Santa Clara, CA (US)

( * ) Notice: Subject to any disclaimer, the term of this patent is extended or adjusted under 35 U.S.C. 154(b) by 0 days.

(21) Appl. No.: 15/402,784

(22) Filed: Jan. 10, 2017

(65) Prior Publication Data

US 2017/0297700 A1    Oct. 19, 2017

Related U.S. Application Data

(63) Continuation of application No. 15/152,413, filed on May 11, 2016, which is a continuation of application No. 14/837,866, filed on Aug. 27, 2015, now Pat. No. 9,365,290, application No. 15/402,784, which is a continuation of application No. 15/152,416, filed on May 11, 2016, now Pat. No. 9,567,071, which is a continuation of application No. 14/837,866, filed on Aug. 27, 2015, now Pat. No. 9,365,290.

(51) Int. Cl.
| | |
|---|---|
| *B64C 29/00* | (2006.01) |
| *B64C 29/02* | (2006.01) |
| *G05D 1/10* | (2006.01) |
| *G05D 1/08* | (2006.01) |
| *B64C 11/00* | (2006.01) |
| *B64C 9/00* | (2006.01) |

(52) U.S. Cl.
CPC ............ *B64C 29/02* (2013.01); *B64C 11/001* (2013.01); *G05D 1/0858* (2013.01); *G05D 1/102* (2013.01); *B64C 2009/005* (2013.01)

(58) Field of Classification Search
CPC ...... B64C 29/02; B64C 29/04; G05D 1/0858; G05D 1/102
See application file for complete search history.

(56) References Cited

U.S. PATENT DOCUMENTS

| | | |
|---|---|---|
| 3,036,794 A | 5/1962 | Mallinckrodt |
| 5,765,783 A | 6/1998 | Albion |
| RE36,487 E | 1/2000 | Wainfan |
| 6,561,455 B2 | 5/2003 | Capanna |

FOREIGN PATENT DOCUMENTS

| | | |
|---|---|---|
| DE | 102008004054 A1 | 7/2009 |
| WO | 2006016018 A1 | 2/2006 |

OTHER PUBLICATIONS

Stephen Morris, "V-Bat Autonomous Transition", Mar. 17, 2015, Youtube.com, https://youtu.be/p-_3-9HYuPc.*

(Continued)

*Primary Examiner* — Brian M O'Hara
(74) *Attorney, Agent, or Firm* — Baker & McKenzie LLP

(57) ABSTRACT

An aircraft includes a fuselage, a wing, a ducted fan and a controller. The wing and the ducted fan are coupled to the fuselage. The controller is operable to control the aircraft in a vertical flight mode, a horizontal flight mode, and transition the aircraft from the vertical flight mode to the horizontal flight mode.

29 Claims, 10 Drawing Sheets

(56) References Cited

OTHER PUBLICATIONS

YouTube video entitled, "3D Pilot Michael Wargo and Robert Griffin, AKA PCRedBaron team up with HobbyKing for a how to Fly 3D series of tips to help RC pilots learn to fly the full range of 3D maneuvers. This is Part 4 of the series and Features Hovering and Torque Rolls", uploaded on Sep. 16, 2011 at https://www.youtube.com/watch?v=aqOEwCzR3YQ.

An International Search Report and Written Opinion of the International Searching Authority in connection with International Patent Application No. PCT/US2016/049086 dated Feb. 2, 2017.

YouTube Video, entitled "V Bat", uploaded to YouTube Jul. 27, 2011 (Jul. 27, 2011), attributed to smorrismlbco; <<https://www.youtube.com/watch?v=lpRxkMEN3pY>>; entire document.

* cited by examiner

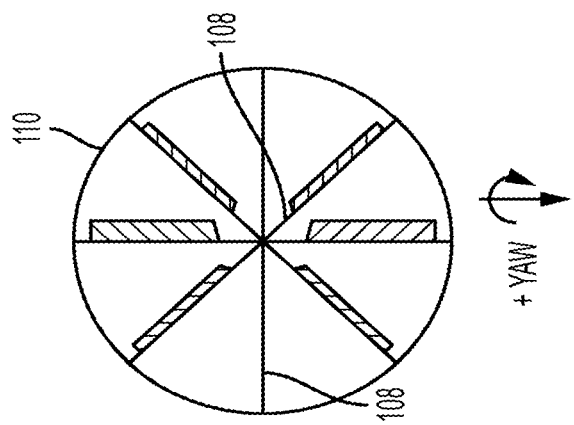
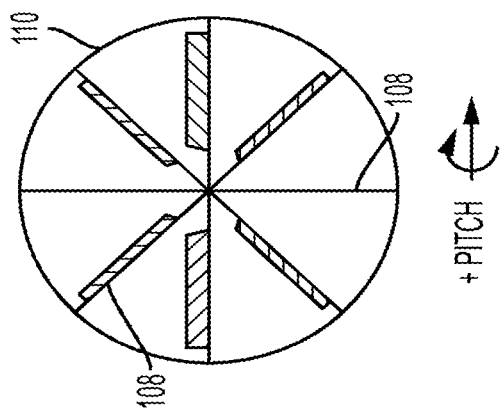
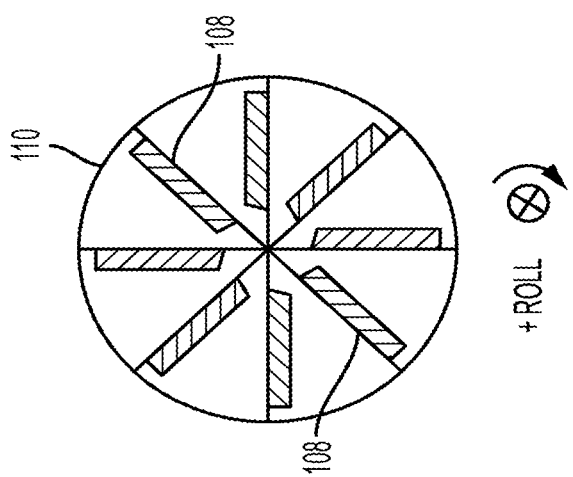

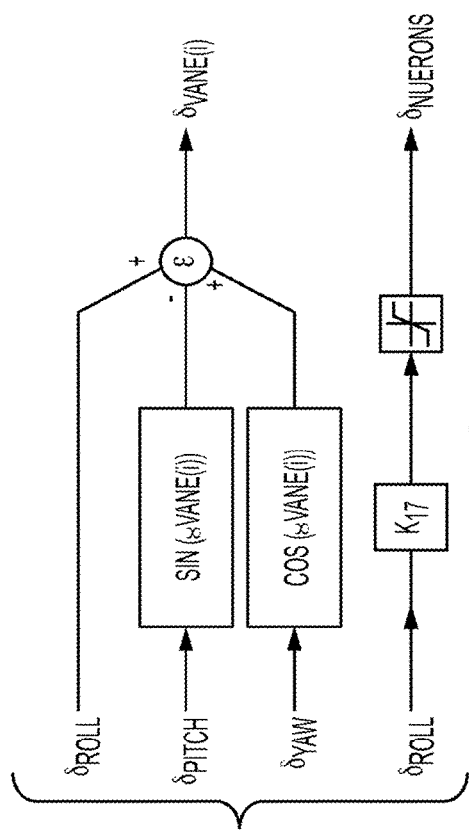
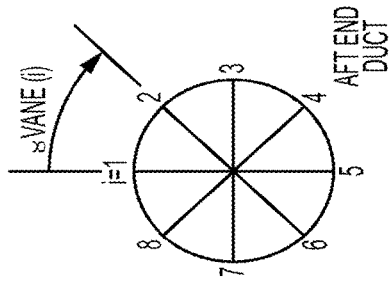
FIG. 14B
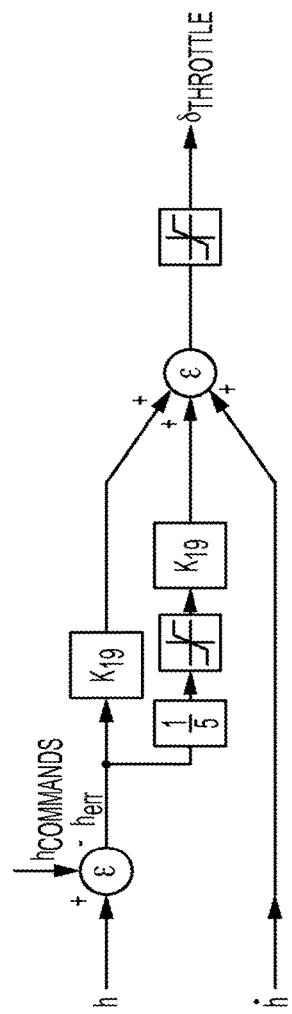
FIG. 14A
FIG. 14C

VERTICAL TAKE OFF AIRCRAFT

CROSS-REFERENCE TO RELATED APPLICATIONS

This application is a continuation of U.S. patent application Ser. No. 15/152,413, filed on May 11, 2016, which is a continuation of U.S. patent application Ser. No. 14/837,866, filed on Aug. 27, 2015, now U.S. Pat. No. 9,365,290. This application is also a continuation of U.S. patent application Ser. No. 15/152,416, filed on May 11, 2016, which is a continuation of U.S. patent application Ser. No. 14/837,866, filed on Aug. 27, 2015, now U.S. Pat. No. 9,365,290. The contents of each of which are hereby incorporated by reference in their entirety for all purposes.

BACKGROUND

Aircraft are generally considered to be one of two different types based on how they generate lift. A first type generates lift force from air passing over a fixed wing. This type of aircraft generally has a good lifting capacity, which also means that it can carry large amounts of fuel for sustained flight. However, because air needs to pass over the wing to generate the lift force, the aircraft must be accelerated on the ground until sufficient lift can be generated for take off. This limits the use of the aircraft to locations where there are suitable and accessible areas to accommodate take off and landing procedure.

A second type of air craft generates lift force from a rotating blade. Because the blade itself rotates, a lift force can be generated while the aircraft is stationary on the ground enabling it to be deployed from locations that cannot accommodate take off and landing of a fixed wing aircraft. However, significantly more power is required to generate a lifting force thereby limiting the fuel capacity and range of the aircraft. This type of aircraft is also generally limited to lower air speeds.

There have been some attempts to provide aircraft having a fixed wing and vertical take off capabilities. For example, the F-35 has a vertical take off variant. But, to provide this capability uses an extremely complex reconfiguration of the aircraft. In the F-35, the thrust is vectored toward the ground and a bay having a vertical fan is opened near the front of the aircraft. This reconfiguring is mechanically complex and also makes transitioning the aircraft extremely complex. This type of configuration generally also requires a significant amount of power to lift the aircraft such that the payload and even fuel capacity of the aircraft is reduced limiting its range.

It would be desirable to have an aircraft that combined the range and speed capabilities of the fixed wing aircraft with the take off and landing capabilities of a rotary blade aircraft. It would also be desirable to have such an aircraft of small or medium size that could be easily transported, deployed in a wide variety of terrain, and remotely operated or autonomously operated.

BRIEF SUMMARY

In an embodiment, an aircraft includes a fuselage, a wing, a ducted fan, a propulsion unit, and a controller. The fuselage has a nose end and a second, opposing end defined as a tail end. The wing coupled to the fuselage between the nose end and the tail end. The ducted fan is coupled to the fuselage at a point between a location where the wing is coupled to the fuselage and the tail end of the fuselage. The propulsion unit is coupled to the ducted fan and is operable with the ducted fan to generate a thrust at least equal to a weight of the aircraft. The controller is operable to control the aircraft in (1) a vertical flight mode in which a first lifting force generated by the ducted fan is greater than a second lifting force generated by the wing, (2) a horizontal flight mode in which the second lifting force is greater than the first lifting force, and (3) transition the aircraft from the vertical flight mode to the horizontal flight mode.

In an embodiment, an aircraft includes a ducted fan, a fuselage, a wing, and a controller. The ducted fan has a plurality of controllable vanes. The fuselage is disposed at a first side of the ducted fan and coupled to the ducted fan via one or more connecting members The wing is coupled to the fuselage and disposed at the first side of the ducted fan. The controller is operable to control the aircraft in a vertical flight mode, a horizontal flight mode, and transition the aircraft between the vertical flight mode and the horizontal flight mode.

In a embodiment, a method of transitioning an aircraft that includes a ducted fan having a plurality of radial controllable vanes, a fuselage disposed at a first side of the ducted fan and coupled to the ducted fan via one or more struts, and a wing coupled to the fuselage and disposed at the first side of the ducted fan, includes: flying the aircraft in a vertical flight mode in which a first lifting force generated by the ducted fan is greater than a second lifting force generated by the wing; adjusting the output power and pitching moment of the controllable vanes to accelerate the aircraft in a horizontal direction; and flying the aircraft in a horizontal flight mode in which the second lifting force is greater than the first lifting force.

BRIEF DESCRIPTION OF THE DRAWINGS

FIG. 8A is a tail forward view of an exemplary ducted fan in a positive roll configuration.

FIG. 8B is a tail forward view of an exemplary ducted fan in a positive pitch configuration.

FIG. 8C is a tail forward view of an exemplary ducted fan in a positive yaw configuration.

FIG. 14A is a block diagram of an exemplary control algorithm for determining vane deflections.

FIG. 14B is a tail forward view of an exemplary ducted fan illustrating indexing that may be used with the block diagram of FIG. 14A.

FIG. 14C is a block diagram of an exemplary control algorithm for an altitude controller.

DETAILED DESCRIPTION

Figure 1:
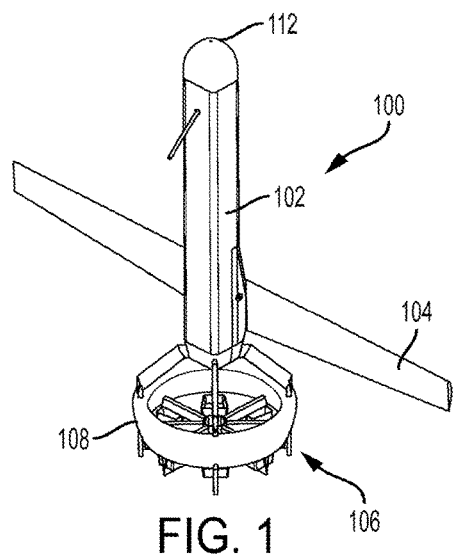
FIG. 1 is a perspective view of an aircraft according to an embodiment.
Figure 2:
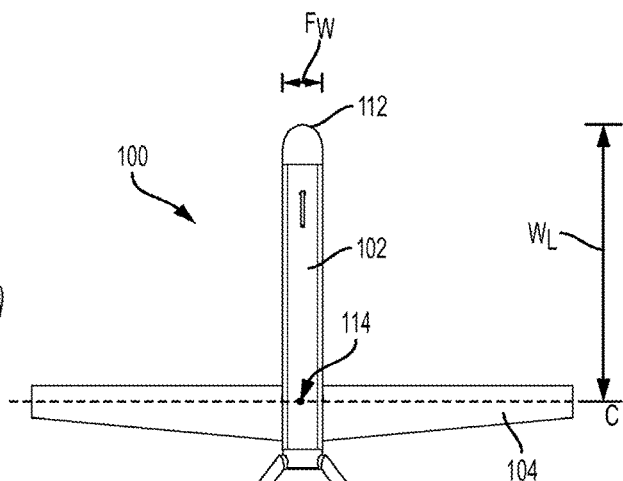
FIG. 2 is a side view of the aircraft of FIG. 1.
Figure 3:
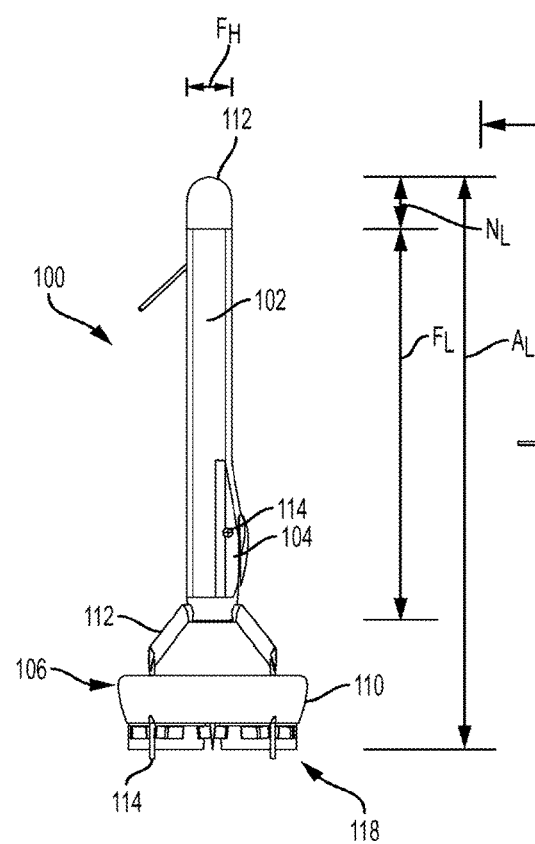
FIG. 3 is another side view of the aircraft of FIG. 1.
Figure 4:
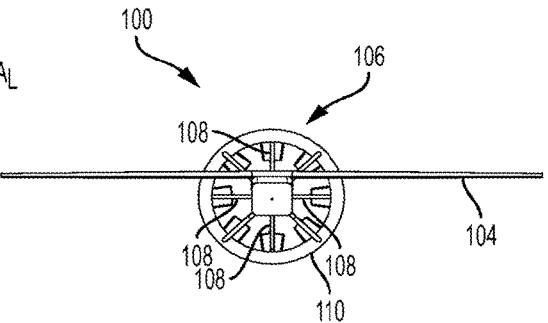
FIG. 4 is a top view of the aircraft of FIG. 1.

Various aspects of an aircraft according to the present disclosure are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Referring to FIGS. 1-4, an aircraft 100 includes a fuselage 102, a wing 104, and a ducted fan lift system 106 with integral control vanes 108. The ducted fan lift system 106 may include: a duct 110 that is coupled to the fuselage 102 by struts 112, and ground contact protrusions 114 extending from the duct 110. The ducted fan system 106 provides enough thrust at zero velocity to allow the aircraft to hover, preferably 25% more thrust than the maximum vehicle weight.

The duct 110 is located at a distance below the wing 104 (i.e., the wing 104 is disposed between a nose of the aircraft and the ducted fan system 106) such that the aircraft's center of gravity (CG) 114 provides lateral and longitudinal stability in wing-borne flight as well as control authority in hover. It will be appreciated that the distance between a tail 118 of the aircraft and a center axis C of the wing may be determined by theoretical analysis and flight tests. In an example, the CG of the aircraft may be disposed at a longitudinal position under the wing of the aircraft. The duct 110 and the control vanes 108 produce restoring moments to align the aircraft to the relative wind, similar to the tail of a conventional aircraft. The control vanes 108 may be deflected to change the moment on the aircraft 100 (as measured about the CG) and they have limited control power to do so based on their size, location relative to the CG, location in the duct, and the airflow through the duct. The duct 110 and vanes 108 are preferably far enough below the CG to provide stability (e.g., restoring moment, which is important for stable high speed flight) and for control power (e.g., ability to create a control moment by deflecting the jet of air emanating from the duct). By analyzing the complete aerodynamics of the aircraft and testing it for all points (speeds) in the transition maneuver, the inventors discovered that it is possible to balance these moments using vane deflection that does not cause the vanes to block the airflow in the duct, for example, within 30 degrees from neutral.

Using a ducted fan for propulsion may provide for the exemplary advantages of: 1) protecting people from the fan blades; 2) serving as a stabilizing surface (e.g., it may replace tail surfaces) when mounted at the back of the aircraft; 3) augmenting the thrust of the fan for a given amount of power input; and 4) allowing for the use of control vanes disposed in the high velocity flow of the fan, which may improve the control authority (for example, as compared to a non-ducted design or a design that might have the propeller mounted on the front of the fuselage).

The control vanes 108 inside the duct are arranged and sized (vane number, geometry, and area) to provide control authority (roll, pitch and yaw torque) in both hover and wing-borne flight. The desired control authority implies a minimum disc loading (i.e. the vehicle's weight divided by the internal disc area) to provide enough velocity over the control vanes 108.

The wing area of the wing 104 is preferably chosen to support the aircraft's weight at a designated speed for the mission. The wing area may be increased from the size selected for cruise on a similar aircraft that operates only in a horizontal flight mode, to facilitate transition from vertical to horizontal flight. For example, the wing area in a horizontal only flight mode aircraft may be selected so that at cruise speed it provides lift equal to the aircrafts maximum weight. If there were no wing, the aircraft would be limited in its maximum tilt angle to a value where the peak thrust time the cosine of the tilt angle is equal to the weight of the aircraft. If the tilt angle exceeds this amount, the aircraft will lose altitude because the vertical thrust will be less than the weight of the aircraft. Inclusion of the wing allows the aircraft to balance its weight at greater tilt angles because the wing will begin to carry the weight (e.g., air begins flowing over the wing and the wing generates lifting force) as the aircraft tilts and gains speed. The wing size (as well as the other design variables) may be selected so that the aircraft may balance the moments (roll, pitch, yaw) and forces (lift, weight, thrust, drag) at each airspeed during the transition maneuver.

The center of gravity 114 of the aircraft may be located at a fraction of the wing chord selected for static pitch stability. The use of a feedback control system allows for more flexibility in the location of the center of gravity. Moving the wing further forward from the CG may destabilize the aircraft in high speed flight but may also produce a moment that helps balance the restoring force of the duct below the CG, making it possible to trim the aircraft with less vane deflection. Preferably, the wing size and distance from the duct, and CG location are selected to provide static stability in high speed flight.

The dimensions and location of the wing of the aircraft 100 are preferably selected to balance the forces and moments acting on the aircraft at any speed between hover and wing-borne flight. This may facilitate the transition maneuver described below.

Thus, a tail-sitter ducted fan VTOL (vertical take off and landing) aircraft may be capable of transitioning with reduced altitude deviations (e.g., less than 100 ft through the transition). The design variables that may be selected in accordance with this disclosure include engine power (e.g., installed maximum horsepower), duct inner diameter, duct chord (or height), duct shape (e.g., airfoil cross section), vane size (e.g., chord), vane shape (which may include additional surfaces at vane tips), vane number, vane arrangement/layout (e.g., radial arrangement, cross arrangement, etc.), vane position relative to duct and aircraft CG, stator size (e.g., the surfaces that lie in front of the vanes), stator shape, aircraft CG location, wing span, wing area, and wing location relative to aircraft CG.

Exemplary design constraints include: 1) roll, pitch, and yaw torques are preferably balanced throughout the transition flight envelope (e.g., control authority from the vanes and any other controls); 2) vane deflection is preferably below the vane saturation limit during transition (the saturation limit is a combined property of the design variables and occurs when the vanes are deflected to the point where a maximum control effect is reached; 3) forces on the vehicle are preferably balanced at all phases of the transition maneuver so that altitude does not change significantly and airspeed can be regulated throughout the maneuver (engine power and wing area are significant design variables with respect to this constraint); 4) the aircraft is preferably statically stable in pitch and yaw when in the high speed flight mode (CG location and duct size relative to the wing size are significant variables with respect to this constraint); and 5) the aircraft preferably meets mission performance requirements (such as range, duration, ceiling, speed, payload capability; wing area, duct size, engine performance, and structural weight are significant design variables with respect to this constraint).

In a particular example, the fuselage may have a width FW of 8 inches, a height FH of 7 inches and a length FL of 66.5 inches. The nose cone of the aircraft may have a length of 8.75 inches. The center chord C of the wing 104 may be 70 inches from the nose of the aircraft. The aircraft may have a width AW of 108 inches, which may also be the wing span, and a length AL of 98.25 inches. The wing area may be 1058 in$^2$. The engine power may be 13 HP. The duct may have eight vanes in a radial arrangement. The stators may be arranged radially and located ahead of each vane. Each stator may have a chord of 1.75" and a thickness of 0.7". The leading edge may have a circular radius of 0.35" and the trailing edge of the stator may be blunt and resting against the leading edge of each vane. The stators may be angled to align with the swirl velocity of the flow from the fan (or propeller).

Control Hardware

Figure 5:
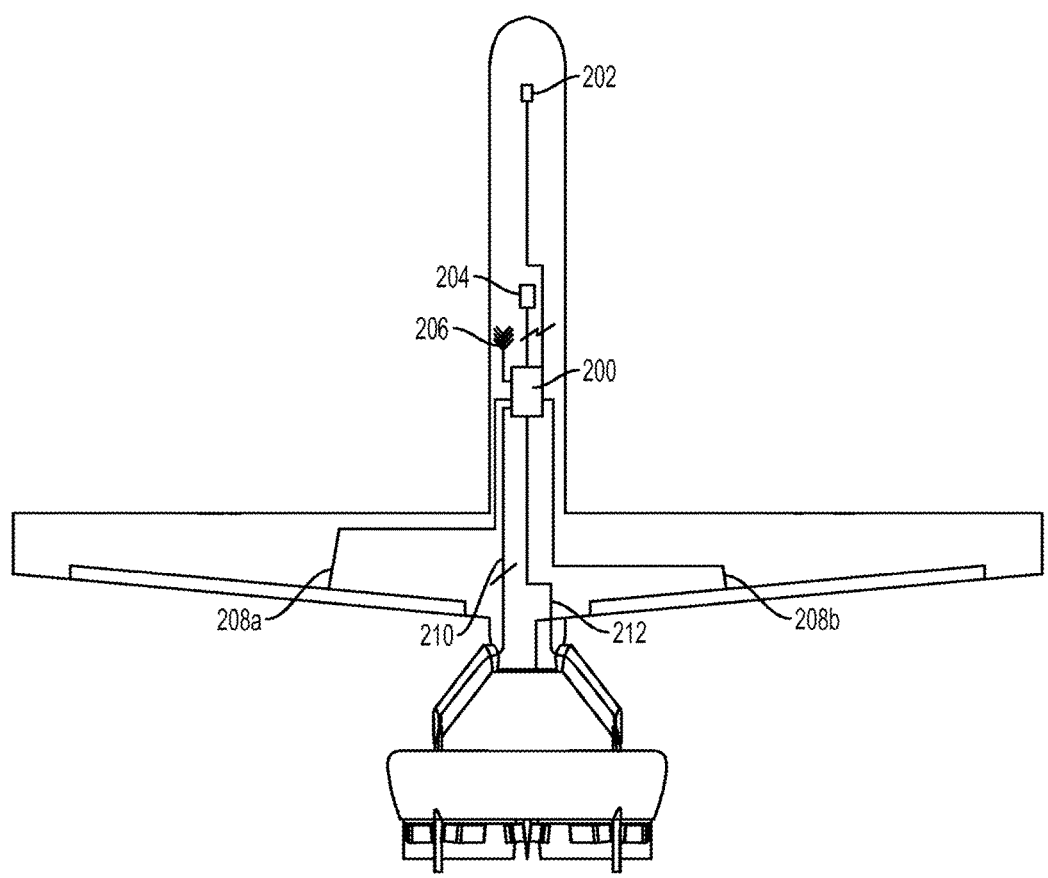
FIG. 5 is a plan view of exemplary control hardware in accordance with the disclosure.

FIG. 5 is a plan view of exemplary hardware in accordance with the disclosure. Aviation control module 200 is an example of specialized hardware for controlling the aircraft. The aviation control module 200 may include an embedded processor, memory (both volatile and non-volatile) that may be programmed to carryout the control algorithms discussed in this disclosure. The aviation control module 200 includes analog and digital input circuits for receiving information from sensors onboard the aircraft. The received information, such as airspeed, orientation and location of the aircraft, may be used by the aviation control module to carry out the control algorithms. It will be appreciated that sensors (and actuators) coupled to the aviation control module may alternatively be provided coupled to other module (or control modules) in communication with the aviation control module 200 by a data bus. Examples of sensors in communication with the aviation control module 200 include air speed sensor 202 (such as a pitot static air tube), and accelerometer or gyro sensor 204 that may sense the orientation of the aircraft in one or more axes. A GPS receiver may be integrated with the aviation control module 200 or also provided as an additional module. The aviation control module 200 may also be coupled to an antenna 206 for use by the GPS receiver and/or communications with the ground or other aircraft. The aviation control module 200 may also be connected to actuators 208a and 208b associated with left and right ailerons as well as the control vane actuators via the control bus 210 and the engine throttle control (e.g., for an internal combustion engine, a turbine, or an electric motor coupled to the vanes of the ducted fan) via the signal wires (or control bus) 212. The combinations of the sensors, the actuators and the specially configured aviation control module provide a specialized and improved platform directed to the technology of the aircraft.

Coordinate System

Figure 6A:
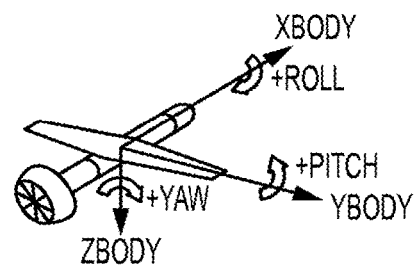
FIG. 6A is a perspective illustration of an aircraft coordinate system.
Figure 6B:
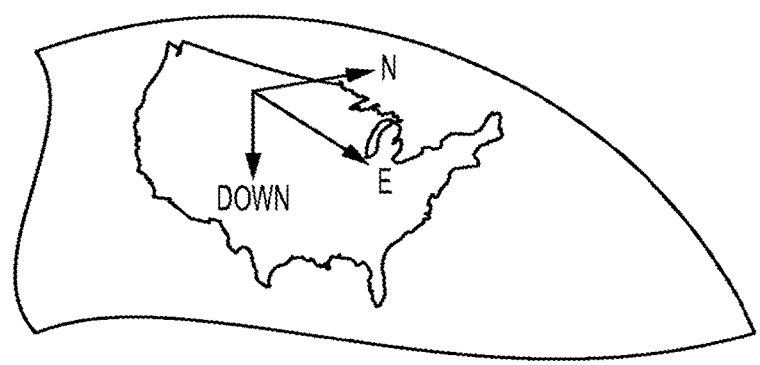
FIG. 6B is a perspective illustration of an earth coordinate system.

The following discussion refers to two coordinate systems, which are right handed orthogonal system. FIG. 6A illustrates an aircraft coordinate system. The aircraft coordinate system includes the body axes: X body=nose forward; Y body=right wing; and Z body=towards fuselage bottom (belly). FIG. 6B illustrates an earth coordinate system. The earth coordinate system includes the earth axes: X earth=North; Y earth=East; and Z earth=Down.

Euler Angles

Euler angles are an ordered set of rotations about the axes defined above that describe a change in orientation from one frame of reference to another. The rotation order is important in these definitions. Hover and transition Euler angles include a transform from inertial (earth) to body axes using the rotation order: psi (z down, earth), phi (x nose forward, prime), theta (y right wing, body). High Speed Euler Angles include a transform from inertial to body axes, using the rotation order: psi (z down, earth), theta (y right wing, prime), phi (x nose forward, body).

It will be appreciated that the discussion of Euler angles is exemplary and other techniques for describing rotations between coordinate systems (such as quaternions) are within the scope of this disclosure.

Control Axes

In the following discussion, positive (+) roll is defined as right wing down along the body x axis; positive (+) pitch is defined as nose up along the body y axis; and positive (+) yaw is defined as nose right along the body z axis.

Control Deflection

Figure 7:
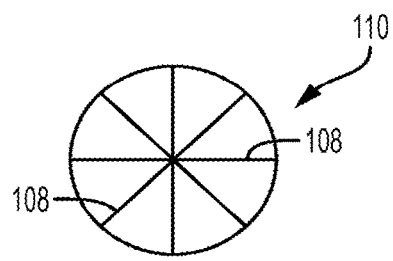
FIG. 7 is a tail forward view of an exemplary ducted fan.

The aircraft may include 8 control vanes 108 located in the duct 110. The vanes 108 may be distributed evenly every 45 degrees along the radii of the duct 110, as shown in FIG. 7. The vanes may be controlled by three high level commands: roll, pitch, and yaw. Each command may be realized as an instruction to deflect the air moving through the duct in a direction that creates a moment about the aircraft's center of gravity that produces the commanded effect. The mapping of the vane deflections is provided below where i is an index of the vane and δ is the magnitude of the deflection, and Φ is the roll associated with that vane. A positive vane deflection is right hand rule positive outward along the radii of the vane.

Roll($i$)=−δ roll

Pitch($i$)=−δ pitch*sin($\Phi_{vane}(i)$)

Yaw ($i$)=δ yaw*cos($T_{vane}(i)$)

The total deflection for each vane is the sum of each command defined above:

Vane($i$)=Roll($i$)+Pitch($i$)+Yaw($i$)

FIG. 8A illustrates a vane configuration for a positive roll. FIG. 8B illustrates a vane configuration for a positive pitch. FIG. 8C illustrates a vane configuration for a positive yaw.

When ailerons contribute to the control moment, that contribution is represented by δ roll.

Outbound Transition

Outbound transition may refer to the portion of the flight where the aircraft starts in a hover (e.g., vertical flight), for example at a certain height and location, and then accelerates, preferably in a smooth and stable manner, to a speed where the aircraft's wing will support the entire weight of the vehicle. The position, orientation (e.g., Euler angles for hover), body axis rotation rates, airspeed, altitude, ground speed, and velocity heading may all be sensed or estimated by the control algorithm for outbound transition of the on board flight control system at a frequency sufficient for controlling the vehicle. A wind estimator may be used to orient the bottom of the fuselage towards the wind prior to transition, and the wind direction may define the courseline heading along which the transition will take place. Orienting the aircraft into the wind may provide for a quicker transition as the aircraft will tilt into the wind to maintain a hover at a specified location. Thus, an air flow direction perpendicular to the span of the wing improves the lift force that is generated. However, it will be appreciated that the transition may also be performed along any heading.

During the transition, the wing may be directed into the wind (e.g., 90 degrees into the wind). This orientation may create more drag than, for example aligning the wing to the air flow but it will also provide lift generated by the wing more quickly and therefore reduce the altitude loss in transition. It will be appreciated that this wing alignment approach is not limited to an aircraft with a ducted fan at the tail and may also be used with aircrafts having propellers and ducted fans at other locations on the aircraft.

The control algorithm may be initialized with the location, heading, and altitude for the beginning of the transition maneuver. Then, the aircraft's ground speed may be commanded to increase at a prescribed acceleration rate (e.g., by a trajectory generator) until the sensed airspeed exceeds the stall speed by a specified margin. At this point the transition may be considered complete and control may be turned over to a high speed flight control algorithm. The flight mode commands from the ground station operator may be associated with a mission flight plan including a list of waypoints, speeds, altitudes, and desired flight modes. Direct commands to the aircraft may also be used. During the transition maneuver the control system preferably maintains altitude and courseline heading while following the commanded acceleration profile along the commanded trajectory.

Figure 9:
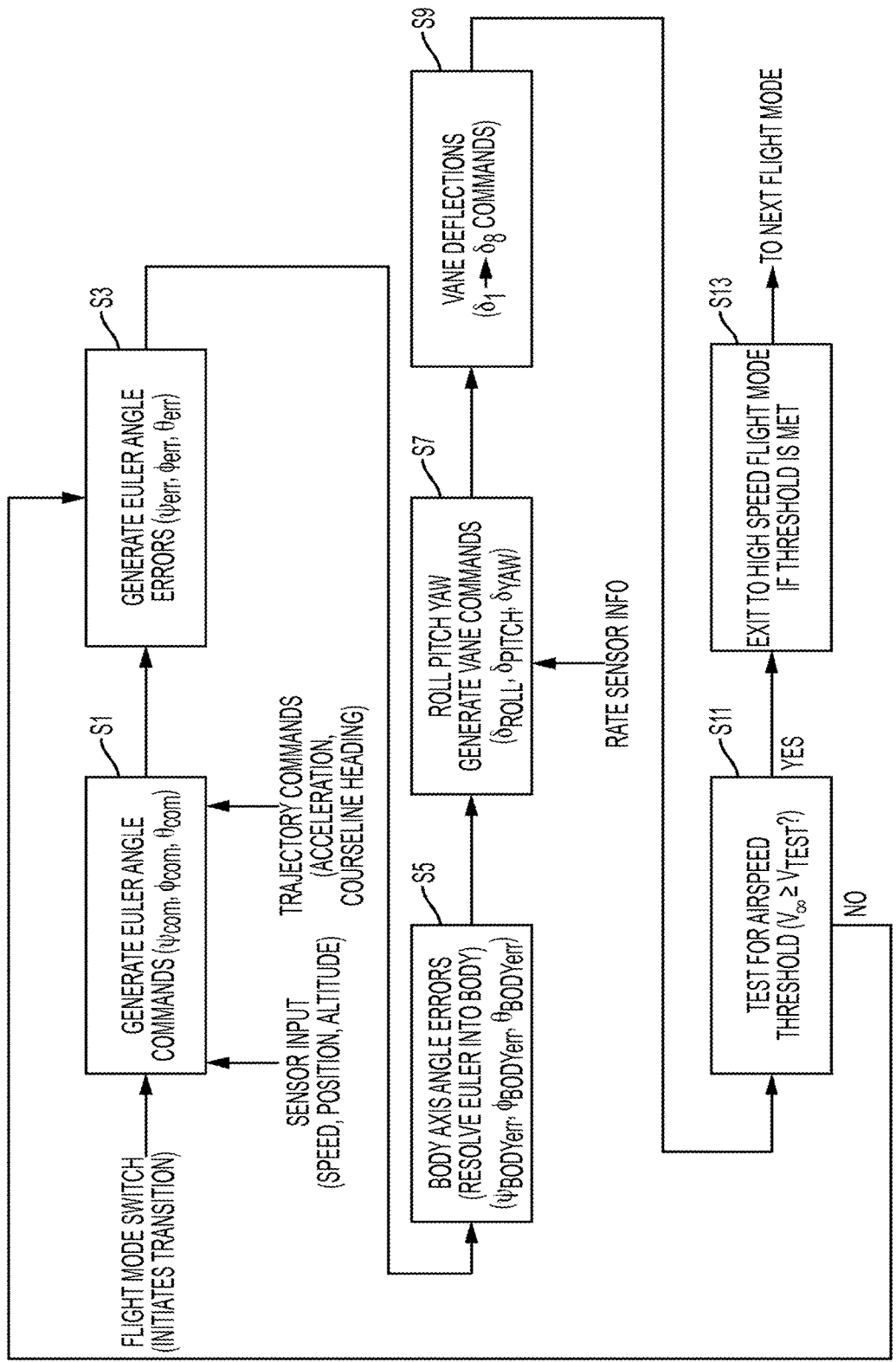
FIG. 9 is a flow diagram of an exemplary outbound transition.
Figure 10:
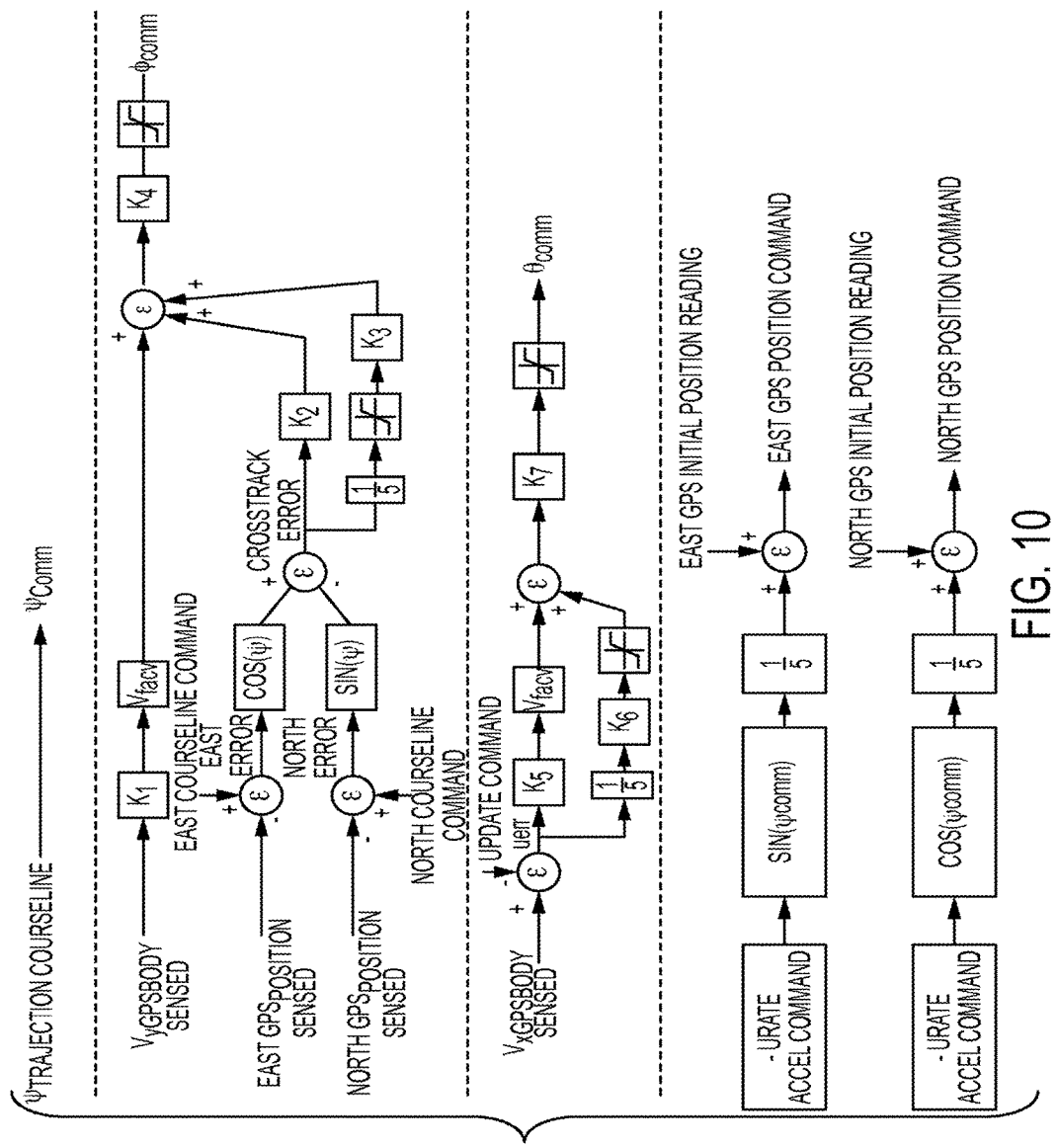
FIG. 10 is a block diagram of an exemplary control algorithm for generating Euler angle commands.

FIG. 9 illustrates an exemplary outbound transition. At step S1, sensory inputs such as speed, position and altitude and trajectory commands such as acceleration and courseline heading are used to generate Euler angle commands for pitch, roll and yaw (e.g., $\psi_{com}$, $\phi_{com}$, $\theta_{com}$ respectively). For example, Euler commands may be generated to orient the aircraft in a prescribed heading and at a prescribed speed to carry out the transition by comparing the sensor inputs to the desired orientation of the aircraft based on the trajectory commands. A specific example of the control logic is provided in FIG. 10.

Figure 11:
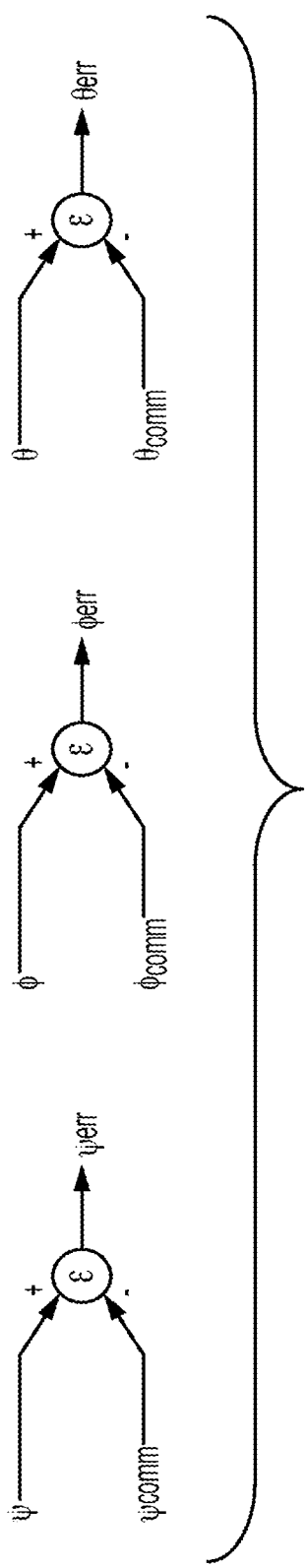
FIG. 11 is a block diagram of an exemplary control algorithm for generating Euler angle errors.

At step S3, Euler angle errors (e.g., $\psi_{err}$, $\phi_{err}$, $\theta_{en}$) may be generated by comparing the Euler angle commands from step S1 with Euler angles associated with the current orientation of the aircraft, for example as shown in FIG. 11.

At step S5, the Euler angle errors may be converted to body axis errors (e.g., $\psi_{body\_err}$, $\phi_{body\_err}$, $\theta_{body\_err}$) using the conversions discussed above. An example of the control logic to convert the errors is provided in FIG. 12.

Figure 13:
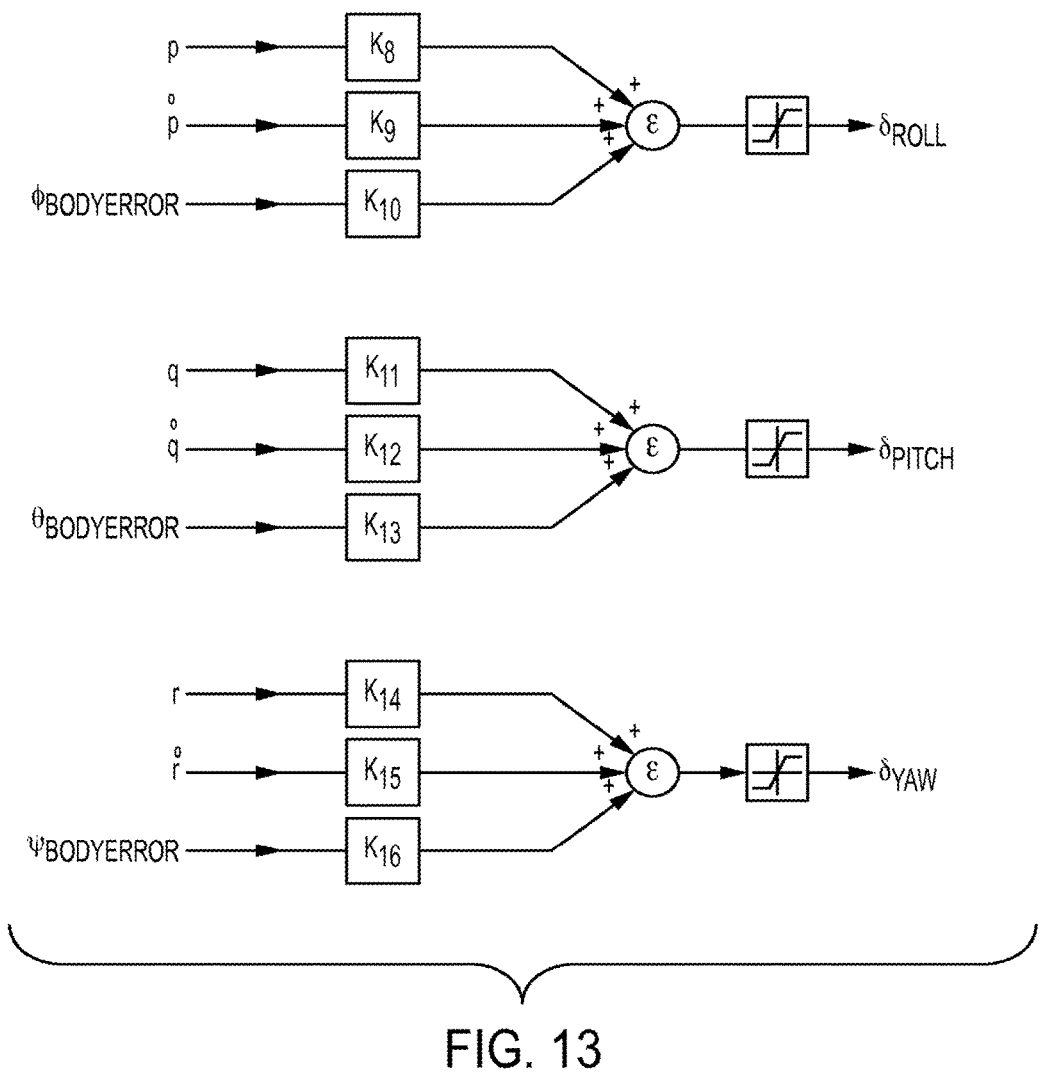
FIG. 13 is a block diagram of an exemplary control algorithm for generating roll, pitch and yaw commands.

At step S7, roll, pitch and yaw commands are determined to generate vane commands (e.g., $\delta_{roll}$, $\delta_{pitch}$, $\delta_{yaw}$). An example of the control logic to convert the errors is provided in FIG. 13. The variables used in FIG. 13 are defined as follows:

p=roll rate (about x-body axis)
pdot=roll acceleration (about x-body axis)
φbody error=computed roll angle (about x-body axis)
δroll=roll axis vane command (used to compute individual vane deflections)
q=pitch rate (about y-body axis)
qdot=pitch acceleration (about y-body axis)
θbody error=computed pitch angle (about y-body axis)
δpitch=pitch axis vane command (used to compute individual vane deflections)
r=yaw rate (about z-body axis)
rdot=yaw acceleration (about z-body axis)
ψbody error=computed yaw angle (about z-body axis)
δyaw=yaw axis vane command (used to compute individual vane deflections)
K8-16=control gains At step S9, the vane commands are converted to vane deflections. For example, if the vane command is for 20% roll, 30% pitch and 40% yaw and the deflections in FIGS. 8A-8C represent 100% roll, pitch and yaw, then each vane may be assigned a deflection associated with 20% of its position in FIG. 8A, 30% of its position in FIG. 8B and 40% of its position in FIG. 8C. Another example of a control algorithm to determine vane deflection is shown in FIG. 14A. FIG. 14B illustrates an indexing pattern for the vanes that may be used with the control algorithm of FIG. 14A. FIG. 14C illustrates an exemplary control algorithm for an altitude controller to determine a throttle setting. The variables used in FIG. 14 are defined as follows:

δroll=roll axis vane command (used to compute individual vane deflections)
δpitch=pitch axis vane command (used to compute individual vane deflections)
δyaw=yaw axis vane command (used to compute individual vane deflections)
γvane(i)=individual vane azimuth angle as shown in FIG. 14B.
δvane(i)=ith computed vane deflection
δailerons=computed aileron deflection
δthrottle=yaw computed engine throttle setting
h=altitude
hcommand=altitude command
herr=altitude error
hdot=altitude rate At step S11, the air speed of the aircraft is checked to see if it is above a threshold (e.g., 125% of the stall speed). If so, the process advances to the next flight mode (e.g., high speed flight) at step S13. If not, the process returned to step S3 and thereafter repeats until the transition is completed.

The outbound transition flight control block diagram may include low level control loops that determine how the control surfaces and throttle will be commanded to achieve the desired motion. There may be four control feedback loops each commanding a control axis ($\delta_{roll}$, $\delta_{pitch}$, $\delta_{yaw}$) based on a PID (proportional integral derivative) control logic. The variables being regulated may be the body axis orientation commands required to achieve the trajectory guidance previously described as well as speed and altitude. Of course, it will be appreciated that other control algorithms and variations to the disclosed algorithms are also contemplated.

Figure 12:
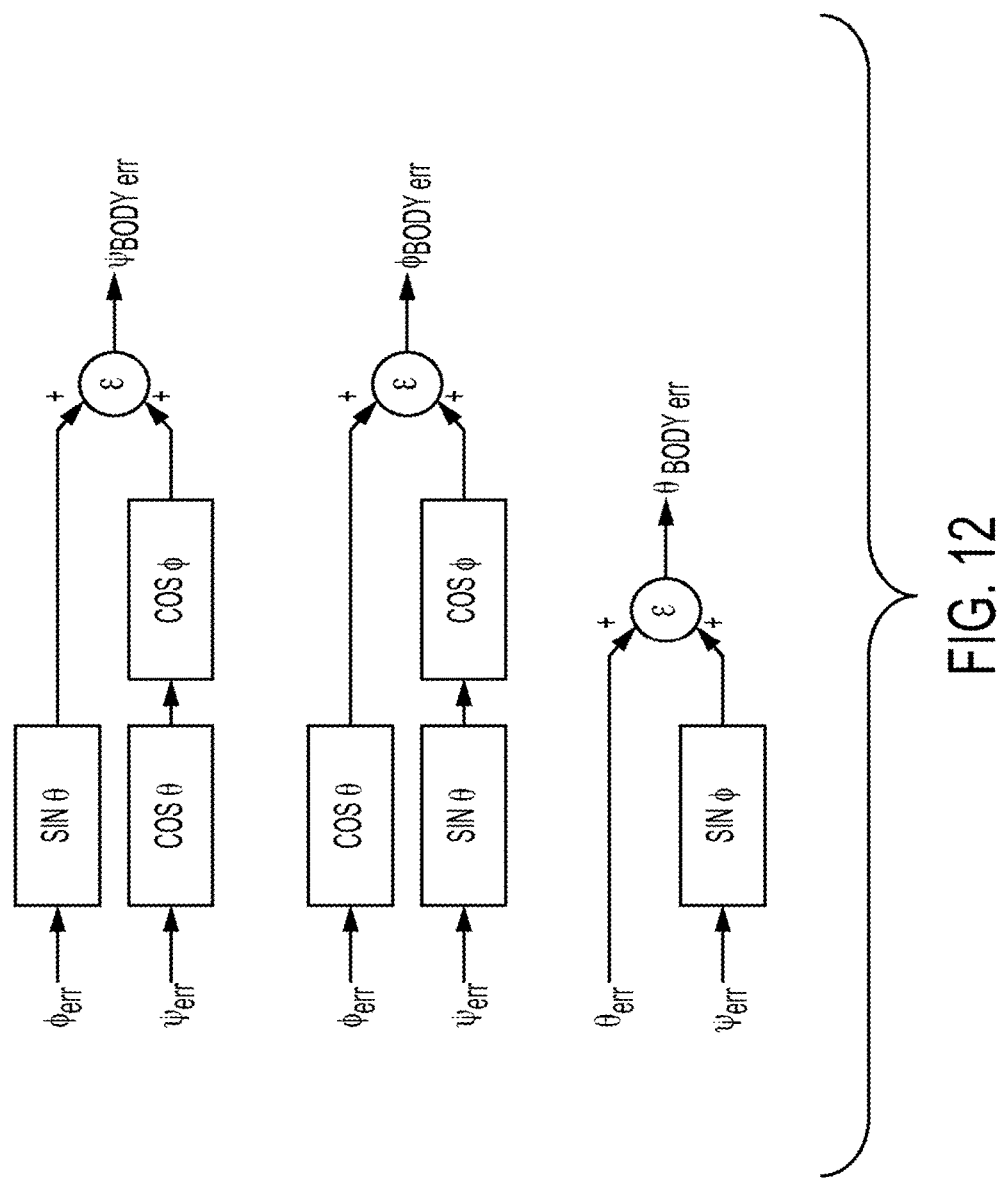
FIG. 12 is a block diagram of an exemplary control algorithm for generating body axis Euler angles.

The body axis rotation angles may be calculated at a level above the low level PID feedback control loop. These angles represent the total rotation about each of the vehicle's orthogonal body axes (see FIG. 6) that may align the aircraft's velocity vector with the computed courseline for the transition maneuver as well as maintain the desired acceleration profile. FIG. 12 shows the determination of the body axis rotation angles. First, rotation commands may be determined that may cause the vehicle's orientation (as defined by the Euler angles used in hover) to align with the prescribed transition trajectory and speed command. These commands may be in a non-orthogonal set of axes that are not fixed in the body of the aircraft. Kinematic relations may be used to transform each command Euler rotation into the orthogonal vehicle body axis coordinate system so that they can be used for direct feedback control of the roll, pitch, and yaw commands. These body axis rotation commands may also be based on PID control logic so that the desired variables can be regulated in a robust manner.

The velocity error between the vehicle's ground speed and the commanded speed may affect the pitch angle command and the cross track error from the desired courseline may affect the bank angle command. The heading command may be determined by the error between the aircraft's actual heading and the heading of the specified transition courseline, which may be a function of the local wind direction and terrain considerations. The altitude error between the commanded and actual altitude may be used to command the throttle control.

FIGS. 10-13 shows how the Euler angle commands may be generated and then transformed into the body axis rotation angles which may then used in the inner control loops to determine the roll, pitch, and yaw commands. FIG. 14 shows how the roll, pitch, and yaw commands may be used to calculate the deflection of each control vane.

With respect to FIGS. 10-14, the depicted control algorithms include the possibility for gain scaling (coefficients $K_x$) based on airspeed and other parameters. The gain scaling for airspeed may increase stability as the airspeed increases from hover through transition and the magnitude of each gain may be adjusted based on the instantaneous airspeed of the vehicle.

These control loops may be executed as described until the prescribed transition airspeed is exceeded (e.g., 125% of the stall speed) at which point the flight mode is switched to the high speed mode or to the next commanded value if the aircraft receives a direct command from the operator.

Inbound Transition

Inbound transition refers to the portion of the flight where the aircraft starts in an established high speed flight (e.g., wing-borne flight) at a height, airspeed, and location and then decelerates, preferably in a smooth and stable manner, to a speed where the aircraft's motion over the ground is lower than a specified ground speed velocity threshold and then switches to a hover mode controller. The control algorithm for inbound transition may be the same as the one described above for the outbound transition except that the initial conditions differ and the velocity is commanded at a specified deceleration rate rather than accelerating. A wind estimator may be used to orient the bottom of the fuselage towards the wind prior to inbound transition. The wind direction may preferably define the courseline heading along which the transition will take place. The position where the transition will be conducted can be estimated prior to the maneuver and the starting point can then be chosen so that the maneuver will be completed near a specified location, such as the landing zone. The control algorithm may be initialized with the location, heading, ground speed, and altitude for the beginning of the inbound transition maneuver. The control algorithm may also be initialized with the location, heading, ground speed, and altitude for the end of the inbound transition maneuver and the values for the beginning of the maneuver calculated from the desired ending values. The maneuver may be considered complete when the actual groundspeed is lower than the prescribed hover threshold speed and then the flight mode may be switched to hover unless commanded otherwise by the flight plan or ground station operator.

The commanded deceleration rate is preferably chosen to avoid significant altitude increase during the inbound transition (e.g., less than 100 ft altitude variation through the transition). If the deceleration command is too rapid the vehicle may climb excessively even at the minimum allowable throttle setting and therefore take longer to hover back down to the landing altitude. The aircraft may still be operated safely with such a flare, but is it preferable to select a low deceleration rate to reduce or prevent this from happening.

Another approach to reducing excessive climbing during the inbound transition is to include control surfaces on the wing that diminish the lift (e.g. "spoilers") during the inbound transition and thereby make the maneuver less sensitive to the commanded deceleration rate. These control surfaces may be deployed by the feedback control system to reduce lift as needed to maintain the commanded height.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. An aircraft, comprising:
   a fuselage having a nose end and a second, opposing end defined as a tail end, a forward direction being defined as towards the nose end of the fuselage and an aft direction being defined as opposite to the forward direction;
   a wing coupled to the fuselage between the nose end and the tail end;
   a propulsion unit coupled to the fuselage and disposed aft of a center of gravity of the aircraft; and
   a controller operable to control the aircraft in:
      a vertical flight mode in which a ground speed of the aircraft is below a first threshold,
      a horizontal flight mode in which a sensed airspeed of the aircraft is above a second threshold, and
      a transition flight mode in which the aircraft transitions from the vertical flight mode to the horizontal flight mode, wherein
   in the transition flight mode, the controller is operable to:
      orient the aircraft into a wind based on trajectory commands by comparing sensor inputs to a desired orientation, and
      accelerate the aircraft until the sensed airspeed exceeds a stall speed of the aircraft by a margin, and
   the controller is operable to transition the aircraft from the vertical flight mode to the horizontal flight mode while maintaining altitude of the aircraft within 100 ft throughout the transition flight mode.

2. The aircraft of claim 1, wherein the propulsion unit is disposed aft of a trailing edge of the wing.

3. The aircraft of claim 1, wherein the propulsion unit is operable to provide directed thrust.

4. The aircraft of claim 1, wherein in the vertical flight mode, a first lifting force generated by the propulsion unit is greater than a second lifting force generated by the wing.

5. The aircraft of claim 1, wherein in the horizontal flight mode, a second lifting force generated by the wing is greater than a first lifting force generated by the propulsion unit.

6. The aircraft of claim 1, wherein the first threshold is a prescribed hover threshold speed.

7. The aircraft of claim 6, wherein the second threshold is at least 125% of the stall speed of the aircraft.

8. The aircraft of claim 1, wherein in the transition flight mode, the controller is operable to determine a ground speed acceleration rate and accelerate the aircraft at the ground speed acceleration rate until the sensed airspeed exceeds the stall speed by the margin.

9. The aircraft of claim 1, wherein the propulsion unit includes a ducted fan.

10. The aircraft of claim 2, wherein the propulsion unit includes a plurality of control vanes to provide directed thrust.

11. The aircraft of claim 1, wherein the controller is operable to generate commands for pitch, speed and roll based at least in part on sensory input values for speed, position and altitude.

12. The aircraft of claim 11, wherein the controller is operable to generate the commands for pitch, speed and roll based at least in part on the trajectory commands.

13. The aircraft of claim 11, wherein the trajectory commands include acceleration and courseline heading commands.

14. The aircraft of claim 11, wherein the controller is operable to determine Euler angle errors based on the sensory input values and the trajectory commands.

15. The aircraft of claim 14, wherein the controller is operable to determine body axis angle errors based on the Euler angle errors.

16. The aircraft of claim 15, wherein the controller is operable to direct the thrust of the propulsion unit based on the body axis angle errors.

17. The aircraft of claim 1, wherein the controller is operable to transition the aircraft from the horizontal flight mode to the vertical flight mode while maintaining altitude of the aircraft within 100 ft throughout the transition.

18. The aircraft of claim 1, further comprising spoilers, wherein the controller is operable to deploy the spoilers in a transition from the horizontal flight mode to the vertical flight mode.

19. A method of transitioning an aircraft that includes a fuselage, a propulsion unit and a wing, wherein the fuselage includes a nose end and a second, opposing end defined as a tail end, a forward direction is defined as towards the nose end of the fuselage, an aft direction is defined as opposite to the forward direction, the propulsion unit is coupled to the fuselage and disposed aft of a center of gravity of the aircraft, and the wing is coupled to the fuselage, the method comprising using a controller to run a flight control algorithm to:

fly the aircraft in a vertical flight mode in which a ground speed of the aircraft is below a first threshold;

transition the aircraft from the vertical flight mode to a horizontal flight mode while maintaining altitude of the aircraft within 100 ft throughout the transition, the transition including:

orienting the aircraft into a wind based on trajectory commands by comparing sensor inputs to a desired orientation, adjusting a power output of the propulsion unit and a pitching moment of the aircraft to accelerate the aircraft until a sensed airspeed exceeds a stall speed of the aircraft by a margin; and fly the aircraft in the horizontal flight mode in which the sensed airspeed is above a second threshold.

20. The method of claim 19, wherein the propulsion unit includes a ducted fan.

21. The method of claim 20, wherein
the propulsion unit includes a plurality of control vanes to provide directed thrust, and
the adjusting includes adjusting a position of the control vanes.

22. The method of claim 19, further comprising determining commands for pitch, speed and roll based at least in part on sensory input values for speed, position and altitude.

23. The method of claim 22, wherein the determining the commands for pitch, speed and roll is based at least in part on the trajectory commands.

24. The method of claim 23, wherein the trajectory commands include acceleration and courseline heading commands.

25. The method of claim 23, further comprising determining Euler angle errors based on the sensory input values and the trajectory commands.

26. The method of claim 25, further comprising determining body axis angle errors based on the Euler angle errors.

27. The method of claim 26, further comprising directing the thrust of the propulsion unit based on the body axis angle errors.

28. The method of claim 21, further comprising adjusting, after the flying the aircraft in a horizontal flight, the output power of the propulsion unit and pitch moment of the control vanes to decelerate the aircraft in the horizontal direction.

29. The method of claim 19, further comprising, during the adjusting, maintaining trim of the aircraft at an angle of attack between zero degrees and ninety degrees.

* * * * *